US012686436B2

(12) United States Patent
Sabato

(10) Patent No.: US 12,686,436 B2
(45) Date of Patent: Jul. 21, 2026

(54) APPARATUS AND METHOD FOR CONTROLLING STEERING OF VEHICLE

(71) Applicant: HYUNDAI MOBIS CO., LTD., Seoul (KR)

(72) Inventor: Zachary Sabato, Ann Arbor, MI (US)

(73) Assignee: Hyundai Mobis Co., Ltd., Seoul (KR)

( * ) Notice: Subject to any disclaimer, the term of this patent is extended or adjusted under 35 U.S.C. 154(b) by 175 days.

(21) Appl. No.: 18/221,666

(22) Filed: Jul. 13, 2023

(65) Prior Publication Data

US 2025/0019001 A1 Jan. 16, 2025

(51) Int. Cl.
B62D 6/00 (2006.01)
B62D 15/02 (2006.01)

(52) U.S. Cl.
CPC ........... B62D 6/003 (2013.01); B62D 15/024 (2013.01)

(58) Field of Classification Search
CPC ...... B62D 6/003; B62D 15/024; B62D 6/008; B62D 5/046
See application file for complete search history.

(56) References Cited

U.S. PATENT DOCUMENTS

| | | | | |
|---|---|---|---|---|
| 6,089,680 A | * | 7/2000 | Yoshioka | B60T 8/1755 |
| | | | | 303/146 |
| 6,292,734 B1 | * | 9/2001 | Murakami | B60K 28/165 |
| | | | | 701/84 |
| 2002/0109402 A1 | * | 8/2002 | Nakamura | B60T 8/17552 |
| | | | | 303/146 |
| 2002/0147532 A1 | * | 10/2002 | Inagaki | B62D 7/159 |
| | | | | 701/91 |
| 2004/0102894 A1 | * | 5/2004 | Holler | B60T 8/17554 |
| | | | | 340/425.5 |
| 2005/0065697 A1 | * | 3/2005 | Niino | B60T 8/17616 |
| | | | | 180/408 |
| 2005/0071084 A1 | * | 3/2005 | Knoop | B62D 15/0265 |
| | | | | 340/436 |

(Continued)

FOREIGN PATENT DOCUMENTS

| | | | | |
|---|---|---|---|---|
| KR | 10-2005-0094925 A | | 1/2008 | |
| KR | 20200129207 A | * | 11/2020 | B60G 17/018 |

OTHER PUBLICATIONS

KR20200129207A, Lee et al., "Active Suspension Control Method of a Vehicle", published Nov. 18, 2020, English Translation provided by Espacenet (Year: 2020).*

*Primary Examiner* — Jason Holloway
*Assistant Examiner* — Benjamin J Brosh
(74) *Attorney, Agent, or Firm* — Morgan, Lewis & Bockius LLP

(57) ABSTRACT

An apparatus for controlling a steering of a vehicle according to an aspect of the present invention, the apparatus including: a sensor system configured to detect a traveling state of the vehicle; a memory configured to store specification information of the vehicle; and a processor configured to control a turning of the vehicle by calculating a target steering angle corresponding to a target yaw parameter required when the vehicle is turning, wherein the processor is configured to: calculate vertical forces acting on wheels of the vehicle when the vehicle is turning, based on the traveling state and specification information of the vehicle; and calculate a final target steering angle based on the calculated vertical forces to ensure that the target yaw parameter is secured.

5 Claims, 3 Drawing Sheets

(56)  References Cited

U.S. PATENT DOCUMENTS

| | | | |
|---|---|---|---|
| 2005/0236782 A1* | 10/2005 | Kobayashi | B60G 21/06 |
| | | | 280/6.159 |
| 2006/0069480 A1* | 3/2006 | Hiwatashi | B62D 6/003 |
| | | | 701/1 |
| 2007/0294009 A1* | 12/2007 | Yasui | B62D 6/003 |
| | | | 701/41 |
| 2008/0119988 A1* | 5/2008 | Yasui | B62D 7/159 |
| | | | 701/41 |
| 2008/0275607 A1* | 11/2008 | Ammon | B60G 17/0163 |
| | | | 701/38 |
| 2009/0018725 A1* | 1/2009 | Ono | B60T 8/17551 |
| | | | 701/36 |
| 2009/0024293 A1* | 1/2009 | Takenaka | B62D 6/002 |
| | | | 701/71 |
| 2009/0276124 A1* | 11/2009 | Suzumura | B60T 8/1755 |
| | | | 701/42 |
| 2010/0161178 A1* | 6/2010 | Kodaira | B62D 6/003 |
| | | | 701/41 |
| 2013/0144476 A1* | 6/2013 | Pinto | B60L 50/00 |
| | | | 903/930 |
| 2017/0361868 A1* | 12/2017 | Guy | B60W 40/13 |
| 2019/0084616 A1* | 3/2019 | Bronikowski | B60G 17/0162 |
| 2019/0276009 A1* | 9/2019 | Okada | B60W 40/13 |
| 2019/0322313 A1* | 10/2019 | Münch | B60W 60/00 |
| 2021/0001835 A1* | 1/2021 | Kanda | B62D 6/003 |
| 2021/0061041 A1* | 3/2021 | Tagami | B62D 6/04 |
| 2021/0269087 A1* | 9/2021 | Zhao | B62D 5/0484 |
| 2021/0403078 A1* | 12/2021 | Sano | B60G 3/26 |
| 2024/0001924 A1* | 1/2024 | Giovanardi | B60W 30/04 |
| 2024/0132152 A1* | 4/2024 | Fu | B60W 30/02 |
| 2024/0208569 A1* | 6/2024 | Fagergren | B62D 6/002 |

* cited by examiner

APPARATUS AND METHOD FOR CONTROLLING STEERING OF VEHICLE

BACKGROUND

Field

Exemplary embodiments of the present disclosure relate to an apparatus and method for controlling steering of a vehicle.

Discussion of the Background

Power steering in a vehicle is a power-driven steering device that helps a driver to control a steering wheel. This type of power steering has commonly utilized hydraulics, but in recent years, there has been an increase in the use of motor-driven power steering (MDPS) systems, which utilize the power of a motor. This is because MDPS systems have the advantage of being lighter in weight, taking up less space, and requiring no oil changes compared to traditional hydraulic power steering systems.

Recently, steer by wire (SBW) systems have been developed and applied to eliminate mechanical connection devices such as steering columns, universal joints, and pinion shafts between the steering wheel and wheels, and steer the vehicle by controlling the driving of a motor connected to a rack with electrical signals. The SBW system may be configured to include a steering wheel for a steering control by a driver, a reaction force motor installed on one side of the steering wheel to provide a reaction force torque in response to the rotation of the steering wheel, an actuator connected to the rack to implement the steering control, an angular sensor for detecting a steering angle, a vehicle speed, and a torque on the steering wheel, and an ECU for driving the actuator and reaction force motor based on electrical signals input from the sensor.

For steering systems such as MDPS or SBW, the steering of the vehicle is controlled by computing a target yaw value and calculating a target steering angle so that an actually measured yaw value follows the target yaw value when the vehicle is turning. However, the yaw value of the vehicle is affected not only by a lateral force of the vehicle, but also by a vertical force acting on the wheels caused by the gradient or unevenness of the road in addition to the vehicle motion. Therefore, if the steering of the vehicle is controlled in consideration of only the lateral component of the vehicle, such as the lateral force, without considering the vertical force, there is a problem in that the target yaw value is not secured, resulting in a decrease in turning stability and riding comfort of the driver.

The background technology of the present invention is disclosed in Korean Patent Application Laid-Open No. 10-2005-0094925 (published on Sep. 29, 2005).

SUMMARY

Various embodiments are directed to solving the above described problems, and an object according to one aspect of the present invention is to provide an apparatus and method for controlling a steering of a vehicle that may calculate a target steering angle and control the steering of the vehicle in consideration of not only a lateral force of the vehicle but also a vertical force acting on the wheels when the vehicle is turning, thereby improving the stability of the turning of the vehicle and the riding comfort for the driver.

In an embodiment, an apparatus for controlling a steering of a vehicle according to an aspect of the present invention includes: a sensor system configured to detect a traveling state of the vehicle; a memory configured to store specification information of the vehicle; and a processor configured to control a turning of the vehicle by calculating a target steering angle corresponding to a target yaw parameter required when the vehicle is turning, wherein the processor is configured to: calculate vertical forces acting on wheels of the vehicle when the vehicle is turning, based on the traveling state and specification information of the vehicle; and calculate a final target steering angle based on the calculated vertical forces to ensure that the target yaw parameter is secured.

In an embodiment, the vertical forces comprise a first vertical force acting on a left wheel and a second vertical force acting on a right wheel, and the processor calculates the first and second vertical forces in consideration of a vertical force transfer of the left wheel and the right wheel when the vehicle is turning.

In an embodiment, the processor calculates a roll moment of the vehicle based on the traveling state and specification information of the vehicle, calculates the vertical force transfer of the left wheel and the right wheel based on the calculated roll moment, and calculates the first and second vertical forces based on the calculated vertical force transfer.

In the present invention, the processor calculates the final target steering angle through a process of calculating a control effectiveness matrix indicating the influence of the first and second vertical forces on securing the target yaw parameter.

In an embodiment, the processor calculates the control effectiveness matrix based on the first and second vertical forces, and calculates the final target steering angle by means of obtaining a value of a steering angle variable when a loss function factorizing the target yaw parameter, the control effectiveness matrix and the steering angle variable has a minimum value.

In an embodiment, the left wheel and the right wheel are each driven by an independent actuator, and the loss function further comprises a penalty matrix indicating the degree of defect in response to an operation of the actuator as an additional factor.

A method of controlling a steering of a vehicle according to an aspect of the present invention, wherein the steering of the vehicle is controlled by calculating a target steering angle corresponding to a target yaw parameter required when the vehicle is turning, the method comprises comprising: calculating, by a processor, a vertical forces acting on wheels of the vehicle in a turning of the vehicle based on a traveling state and specification information of the vehicle; and calculating, by the processor, a final target steering angle based on the calculated vertical forces to ensure that the target yaw parameter is secured.

According to an aspect of the present invention, the present invention employs the configuration of calculating the target steering angle optimized for a current turning movement of the vehicle based on the vertical force acting on the left and front wheels of the vehicle, and controlling the steering of the vehicle according to the calculated target steering angle, so that the load-sensitive allocation of a vehicle body moment or force is achieved, the target yaw parameter required for turning movement may be normally secured, and the stability of the turning of the vehicle and the riding comfort for the driver may be improved accordingly.

DETAILED DESCRIPTION OF THE ILLUSTRATED EMBODIMENTS

Figure 1:
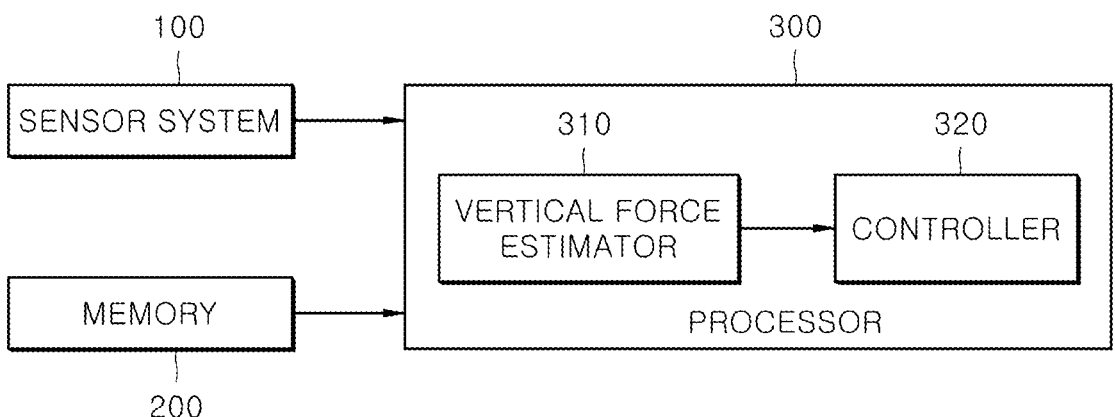
FIG. 1 is a block diagram illustrating an apparatus for controlling a steering of a vehicle according to an embodiment.

Hereinafter, an apparatus and method for controlling a steering of a vehicle according to the present invention will be described below with reference to the accompanying drawings through various exemplary embodiments.

Here, thicknesses of lines, sizes of constituent elements, or the like illustrated in the drawings, may be exaggerated for clarity and convenience of description. In addition, the terms used below are defined considering the functions in the present invention and may vary depending on the intention of a user or an operator or a usual practice. Therefore, such terms should be defined based on the entire contents of the present specification.

FIG. 1 is a block diagram illustrating an apparatus for controlling a steering of a vehicle according to an embodiment.

With reference to FIG. 1, an apparatus for controlling a steering of a vehicle of an embodiment includes a sensor system 100, a memory 200, and a processor 300, in which the processor 300 includes a vertical force estimator 310 and a controller 320. The controller 320 of the processor 300 is configured to control the steering of front and rear wheels by controlling first and second actuators (not illustrated) that drive the front and rear wheels, respectively.

The sensor system 100 senses a traveling state of the vehicle. The traveling state may include various information, such as a steering angle formed as an occupant manipulates the steering wheel, vehicle behavior information such as a vehicle's speed, an acceleration, a yaw, a pitch, and a roll, and information on a traveling environment of the vehicle. To this end, the sensor system 100 may be configured to include various sensors, such as a steering angle sensor, a speed sensor, an acceleration sensor, a yaw/pitch/roll sensor, a camera sensor, and the like.

The memory 200 stores specification information on the vehicle.

Table 1 below lists the traveling states and specification information on the vehicle that applies to the embodiment.

TABLE 1

| | | |
|---|---|---|
| Traveling | A_{lat} | Lateral acceleration |
| state | v_s | Vehicle speed |
| Specification | k_{Tr} | Roll stiffness distribution |
| information | m | Vehicle total mass |
| | m_s | Sprung Mass |
| | a | Distance from front axle to C.G |
| | b | Distance from rear axle to C.G |
| | T_1 | Front Track Width |
| | C1 | Front cornering coefficient |
| | C2 | Rear cornering coefficient |
| | h | Height of C.G |
| | g | Gravity acceleration |

The processor 300 is an entity that integrally controls the steering of the vehicle, and may be implemented as an MDPS ECU or an SBW ECU, and may execute an operating system or an application to control a plurality of hardware or software components connected to the processor 300, and perform various data processing and computations. The processor 300 may be configured to execute at least one instruction stored in the memory 200 and store data resulting from the execution in the memory 200.

When the vehicle is turning, the processor 300 is configured to control the turning of the vehicle by calculating a target steering angle corresponding to a target yaw parameter that is essentially required for the turning of the vehicle, in which the yaw parameter may correspond to a yaw rate or a yaw moment. For example, the processor 300 may control the turning of the vehicle by calculating the target yaw moment on the basis of traveling states such as a vehicle speed and a sideslip angle sensed by the sensor system 100, and calculating the target steering angle such that the error between the yaw moment currently sensed by the sensor system 100 (i.e., the actual yaw moment) and the target yaw moment is a value of "0". The configuration for calculating the target yaw moment and the target steering angle to control the turning of the vehicle is known in the art and will not be described in detail.

Meanwhile, as described above, the yaw moment of the vehicle is affected not only by the lateral component of the vehicle, but also by the vertical force acting on the wheels caused by the gradient or unevenness of the road, and there may be a case that the target yaw moment may not be secured when the steering of the vehicle is controlled in consideration of only the lateral component of the vehicle such as the actual yaw moment. Accordingly, the embodiment employs the configuration of controlling the steering of a vehicle when the vehicle is turning in consideration of the vertical force acting on the wheels, and hereinafter, the configuration of the embodiment will be described in detail with emphasis on an operation of the vertical force estimator 310 and the controller 320 constituting the processor 300.

The vertical force estimator 310 calculates the vertical force acting on the wheels of the vehicle on the basis of the traveling state and specifications of the vehicle when the vehicle is turning, and the vertical force is divided into a first vertical force acting on a left wheel and a second vertical force acting on a right wheel. In this case, a lateral acceleration may be used as the traveling state of the vehicle, and a sprung mass, a height of the vehicle center of gravity, a roll stiffness, a vehicle mass, a distance between a front wheel axle and the vehicle center of gravity, a distance between a rear wheel axle and the vehicle center of gravity, front track width, and a gravitational acceleration may be used as the specification information of the vehicle.

Specifically, the vertical force estimator 310 first calculates a roll moment Mx of the vehicle according to Equation 1 below.

$$M_x = m_s a_{lat} h \qquad \text{[Equation 1]}$$

In Equation 1, the symbols follow Table 1.

Next, the vertical force estimator 310 applies a predefined roll model (roll static model) to the roll moment calculated according to Equation 1 to calculate a vertical force transfer for the left and right wheels when the vehicle is turning. The roll model described above and the vertical force transfer calculation are based on Equations 2 and 3 below, respectively.

5

$$RSM = \alpha \frac{\frac{1}{2}T_1 k_{tr}}{1 + k_{tr}} \qquad \text{[Equation 2]}$$

$$\Delta F_{zL,zR} = f_1(RSM, M_x) \qquad \text{[Equation 3]}$$

In Equations 2 and 3, RSM represents the roll model, a has a value of $\pm 1$ (+1 for calculating the vertical force transfer of the left wheel and −1 for calculating the vertical force transfer of the right wheel), $\Delta F_{zL}$ and $\Delta F_{zR}$ represent the vertical force transfer of the left wheel and the vertical force transfer of the right wheel, respectively, and f1(x,y) represents a function with x and y as factors (e.g., the product of x and y). Other symbols follow Table 1.

Next, the vertical force estimator 310 calculates the first and second vertical forces for the left and right wheels by applying the specification information of the vehicle to the vertical force transfer of the left and right wheels calculated according to Equation 3, which is calculated according to Equation 4 below.

$$\begin{bmatrix} F_{zL} \\ F_{zR} \end{bmatrix} = f_2\left(\frac{mgb}{2(a+b)}, \begin{bmatrix} \Delta F_{zL} \\ \Delta F_{zR} \end{bmatrix}\right) \qquad \text{[Equation 4]}$$

In Equation 4, $F_{zL}$ and $F_{zR}$ represent the first and second vertical forces, respectively, and f2(x,y) represents a function that takes x and y as factors (e.g., the product of x and y). Other symbols follow Table 1.

When the vertical force is calculated through the above process, the controller 320 calculates a final target steering angle based on the calculated vertical force to ensure that a target yaw parameter (target yaw moment) is secured.

Specifically, the controller 320 first calculates a control effectiveness matrix that indicates the influence of the first and second vertical forces on securing the target yaw moment. Based on the dynamics theory of the vehicle, the control effectiveness matrix is calculated according to Equation 5 below, which is expressed as a function of a vehicle speed (According to Equation 5, the control effectiveness matrix can be calculated as [1×2] matrix, the values of the elements of control effectiveness matrix correspond to the control effectiveness values for the left and right wheels, respectively, and each wheel has the same control effectiveness value when the yaw moment is created except for the influence of the load. In Equation 5, "a" is a variable that is applied to convert axle forces to yaw moment).

[Equation 5]

$$k = a\frac{F_y}{\delta}(0) \qquad [11]$$

$$\text{where } \frac{F_y}{\delta}(0) = \frac{C_1 C_2 bm v_s^2}{C_1 C_2 a^2 m + 2C_1 C_2 abm - C_1 am^2 v_s^2 + C_1 C_2 b^2 m + C_2 bm^2 v_s^2}$$

Next, the controller 320 calculates a final target steering angle by means of obtaining a value of a steering angle variable when a loss function factorizing the target yaw moment, the control effectiveness matrix, the steering angle variable, and a penalty matrix has a minimum value. The penalty matrix is a matrix that indicates the degree of defect based on an operation of the first and second actuators, and may be predefined in the controller 320 based on a history of defects or malfunctions of the first and second actuators in controlling the steering when the vehicle is turning.

In this embodiment, the loss function $f_0$ and the steering angle variable $\delta$ are expressed according to Equation 6 below.

$$f_0 = \|\tau_z - k\delta\|_2^2 + Q\|\delta\|_2^2 \qquad \text{[Equation 6]}$$

$$\delta = (k^T k + Q)^{-1} k^T \tau_z$$

In Equation 6, $f_0$ represents the loss function, $\delta$ represents the steering angle variable, Q represents the penalty matrix, and $T_z$ represents the target yaw moment.

The controller 320 specifies a value for the steering angle variable when the loss function of Equation 6 has a minimum value. As the left term $$\|\tau_z - k\delta\|_2^2$$

and right term $$Q\|\delta\|_2^2$$

have smaller values, the value of the loss function in Equation 6 will have a minimum value. A smaller left term $$\|\tau_z - k\delta\|_2^2$$

means that the predicted yaw moment using the calculated $\delta$ is close to the target yaw moment, and a smaller right term $$Q\|\delta\|_2^2$$

means that the actuator failure condition is small. The target steering angle may be actively determined according to the vertical force caused by the gradient or unevenness of the road and motion of the vehicle, so that the originally intended target yaw moment is secured.

With Equation 6, a value of the steering angle variable for the left wheel (a value of a first steering angle variable=final target steering angle of the left wheel) and a value of the steering angle variable for the right wheel (a value of a second steering angle variable=final target steering angle of the right wheel) when the loss function has a minimum value can be calculated respectively, and the controller 320 controls the steering of the left and right wheels according to the final target steering angles of the left and right wheels.

Figure 2:
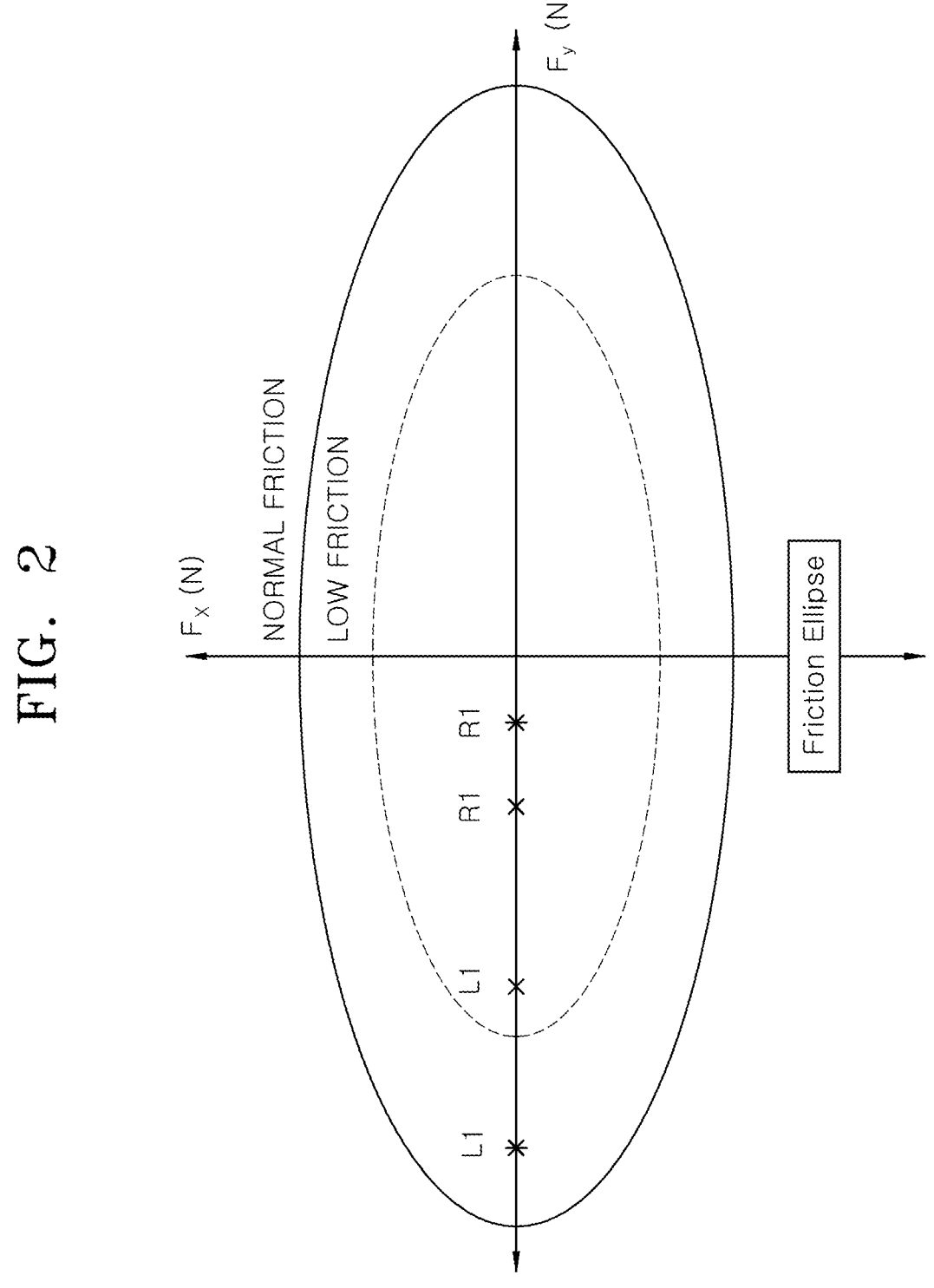
FIG. 2 is an exemplified view illustrating an effect of the apparatus for controlling the steering of the vehicle according to the embodiment.

FIG. 2 illustrates the front left and front right wheels on the friction ellipse before (marked with *) and after (marked with x) the embodiment is applied. Before the application of the embodiment, the lateral force $F_y$ of the front left wheel is outside the 'low friction' zone, which means that the stability of turning is reduced. In contrast, after the application of the embodiment, the lateral forces of both the front left and front right wheels are within the ""low friction"" zone, which means that the stability of turning is more likely.

Figure 3:
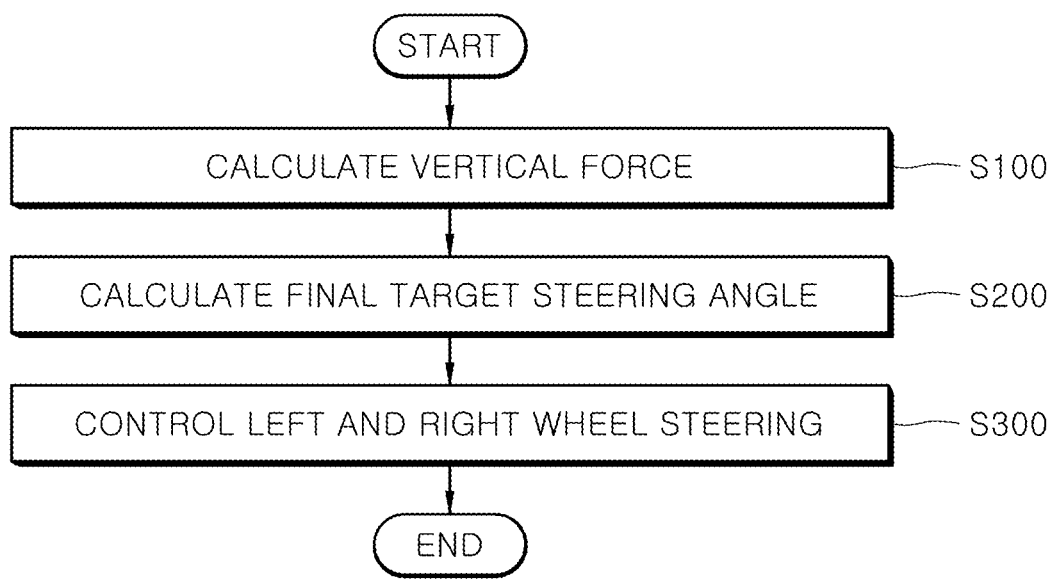
FIG. 3 is a flowchart illustrating a method of controlling a steering of a vehicle, according to the embodiment.

FIG. 3 is a flowchart illustrating a method of controlling a steering of a vehicle, according to the embodiment. With reference to FIG. 3, a method of controlling the steering of the vehicle of the embodiment will be described, with specific descriptions related to parts that are redundant to the above being omitted and the description centered on a time series configuration.

First, the processor 300 calculates the vertical force acting on the wheels of the vehicle (S100) based on the traveling state and specification information of the vehicle when the vehicle is turning. In step S100, the processor 300 calculates the roll moment of the vehicle based on the traveling state and specification information of the vehicle, calculates the vertical force transfer of the left and right wheels based on the calculated roll moment, and calculates the first and second vertical forces based on the calculated vertical force transfer.

Next, the processor 300 calculates the final target steering angle (S200) based on the vertical force calculated in step S100 to ensure that the target yaw parameter required for the current turning movement of vehicle is secured. In step S200, the processor 300 calculates the control effectiveness matrix indicating the influence of the first and second vertical forces on securing the target yaw parameter based on the first and second vertical forces, and calculates the final target steering angle by means of obtaining the value of the steering angle variable when the loss function factorizing the target yaw parameter, the control effectiveness matrix, and the steering angle variable has a minimum value. The penalty matrix, which indicates the degree of defect based on the operation of the actuator, may also be applied as an additional factor in the loss function.

In step S200, a value of the steering angle variable for the left wheel (a value of a first steering angle variable=final target steering angle of the left wheel) and a value of the steering angle variable for the right wheel (a value of a second steering angle variable=final target steering angle of the right wheel) when the loss function has a minimum value can be calculated respectively, and the controller 320 controls the steering of the left and right wheels according to the final target steering angles of the left and right wheels (S300).

As described above, the embodiment employs the configuration of calculating the target steering angle optimized for a current turning movement of the vehicle based on the vertical force acting on the left and front wheels of the vehicle, and controlling the steering of the vehicle according to the calculated target steering angle, so that the load-sensitive allocation of a vehicle body moment or force is achieved, the target yaw parameter required for turning movement may be normally secured, and the stability of the turning of the vehicle and the riding comfort for the driver may be improved accordingly.

For example, the configurations described in the present specification may be implemented as methods or processes, devices, software programs, data stream, or signals. Even though only the implementation of the single form is described (e.g., only the method is described), the described features may also be implemented in other forms (e.g., devices or programs). The device may be implemented as appropriate hardware, software, firmware, and the like. For example, the method may be implemented by devices such as processors generally referring to processing devices including computers, microprocessors, integrated circuits, programmable logic devices, or the like. The processors also include communication devices such as computers, cellular phones, portable/personal information terminals (personal digital assistants (PDA)), and other devices that facilitates information communication with final users.

While the present disclosure has been described with reference to the exemplary embodiment depicted in the drawings, the exemplary embodiment is described just for illustration, and those skilled in the art to which the present technology pertains will understand that various modifications of the exemplary embodiment and any other exemplary embodiment equivalent thereto are available. Accordingly, the technical protection scope of the present disclosure should be determined by the appended claims.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a steering of a vehicle comprising:
   a sensor system configured to detect a traveling state of the vehicle;
   a memory configured to store specification information of the vehicle; and
   a processor configured to calculate vertical forces acting on a left wheel and a right wheel of the vehicle when the vehicle is turning, based on the traveling state and specification information of the vehicle, the vertical forces including a first vertical force acting on the left wheel and a second vertical force acting on the right wheel;
   calculate final target steering angles based on the calculated vertical forces to achieve a target yaw parameter of the vehicle required when the vehicle is turning; and
   control steering of the left wheel and the right wheel based on the final target steering angles,
   wherein the processor calculates the final target steering angles by calculating a control effectiveness matrix indicating an influence of the first vertical force and the second vertical force at the left wheel and the right wheel on achieving the target yaw parameter and by selecting the final target steering angles as values that minimize a loss function incorporating the target yaw parameter, the control effectiveness matrix, and a penalty matrix indicating a degree of defect in response to operation of a first actuator and a second actuator, wherein the control effectiveness matrix is calculated as a [1×2] matrix based on dynamics of the vehicle including at least a traveling speed of the vehicle, and includes control effectiveness values for the left wheel and the right wheel, respectively, each control effectiveness value corresponding to a yaw moment generated according to a lateral force with respect to a steering angle at zero steering angle.

2. The apparatus of claim 1,
   wherein the processor calculates of the first vertical force and the second vertical force in consideration of a vertical force transfer of the left wheel and the right wheel when the vehicle is turning.

3. The apparatus of claim 2, wherein the processor calculates a roll moment of the vehicle based on the traveling state and specification information of the vehicle, calculates the vertical force transfer of the left wheel and the right wheel based on the calculated roll moment, and calculates of the first vertical force and the second vertical force based on the calculated vertical force transfer.

4. The apparatus of claim 1, wherein the left wheel and the right wheel are driven by the first actuator and the second actuator, respectively.

5. A method of controlling a steering of a vehicle, comprising:

calculating, by a processor, vertical forces acting on a left wheel and a right wheel of the vehicle in a turning of the vehicle based on a traveling state and specification information of the vehicle, the vertical forces including a first vertical force acting on the left wheel and a second vertical force acting on the right wheel;

calculating, by the processor, final target steering angles based on the calculated vertical forces to achieve a target yaw parameter of the vehicle required in the turning of the vehicle when the vehicle is turning; and controlling steering of the left wheel and the right wheel based on the final target steering angles, wherein the calculating the final target steering angles includes:

calculating a control effectiveness matrix indicating an influence of the first vertical force and the second vertical force at the left wheel and the right wheel on achieving the target yaw parameter and by selecting the final target steering angles as values that minimize a loss function incorporating the target yaw parameter, the control effectiveness matrix, and a penalty matrix indicating a degree of defect in response to operation of a first actuator and a second actuator, wherein the control effectiveness matrix is calculated as a [1×2] matrix based on dynamics of the vehicle including at least a traveling speed of the vehicle, and includes control effectiveness values for the left wheel and the right wheel, respectively, each control effectiveness value corresponding to a yaw moment generated according to a lateral force with respect to a steering angle at zero steering angle.

\* \* \* \* \*